United States Patent

[11] 3,592,053

| [72] | Inventor | Carroll J. Lucia<br>Box 38, Suamico, Wis. 54173 |
|---|---|---|
| [21] | Appl. No. | 861,982 |
| [22] | Filed | Sept. 29, 1969 |
| [45] | Patented | July 13, 1971<br>Continuation-in-part of application Ser. No. 667,574, Oct. 24, 1967, now Patent No. 3,505,863 |

[54] APPARATUS FOR DETERMINING THE TORQUE PERFORMANCE OF PRIME MOVERS
4 Claims, 12 Drawing Figs.

[52] U.S. Cl................................................... 73/116,
324/162
[51] Int. Cl...................................................G01m 15/00
[50] Field of Search......................................... 324/70 A,
70 CG, 162; 73/116, 128, 134

[56] References Cited
UNITED STATES PATENTS

| 2,100,024 | 11/1937 | Dardani........................ | 73/489 |
| 2,942,184 | 6/1960 | Sihvonen et al. ............. | 324/70 A |
| 3,296,607 | 1/1967 | Pasinski........................ | 235/104 X |
| 3,331,200 | 7/1967 | Byron et al. .................. | 73/116 UX |

FOREIGN PATENTS

| 960,999 | 6/1964 | Great Britain............... | 324/(162) |

*Primary Examiner*—Jerry W. Myracle
*Attorney*—Hauke, Gifford and Patalidis

ABSTRACT: The torque performance of a prime mover is tested, according to the invention, by having its output shaft coupled to a flywheel of known inertia which is driven and accelerated from a first predetermined angular velocity to a second predetermined angular velocity. The time taken for accelerating the flywheel is measured, and the average torque developed by the prime mover is derived from the time taken to accelerate the flywheel. The continuous torque developed, during acceleration, by the prime mover is monitored by measuring the reaction force exerted by the flywheel upon its support during acceleration. Alternately, the invention provides for a test stand on which a prime mover may be tested while a second prime mover is being installed or disconnected, and for comparing the torque developed by a prime mover to the torque of a reference prime mover. The invention further provides a simplified instrumentation system for determining the torque performance of an engine or other prime mover by counting the revolutions of the output shaft at various time intervals during acceleration by means of an impulse signal for each revolution of the shaft which is fed into an impulse counter whose output is connected to a recorder instrument.

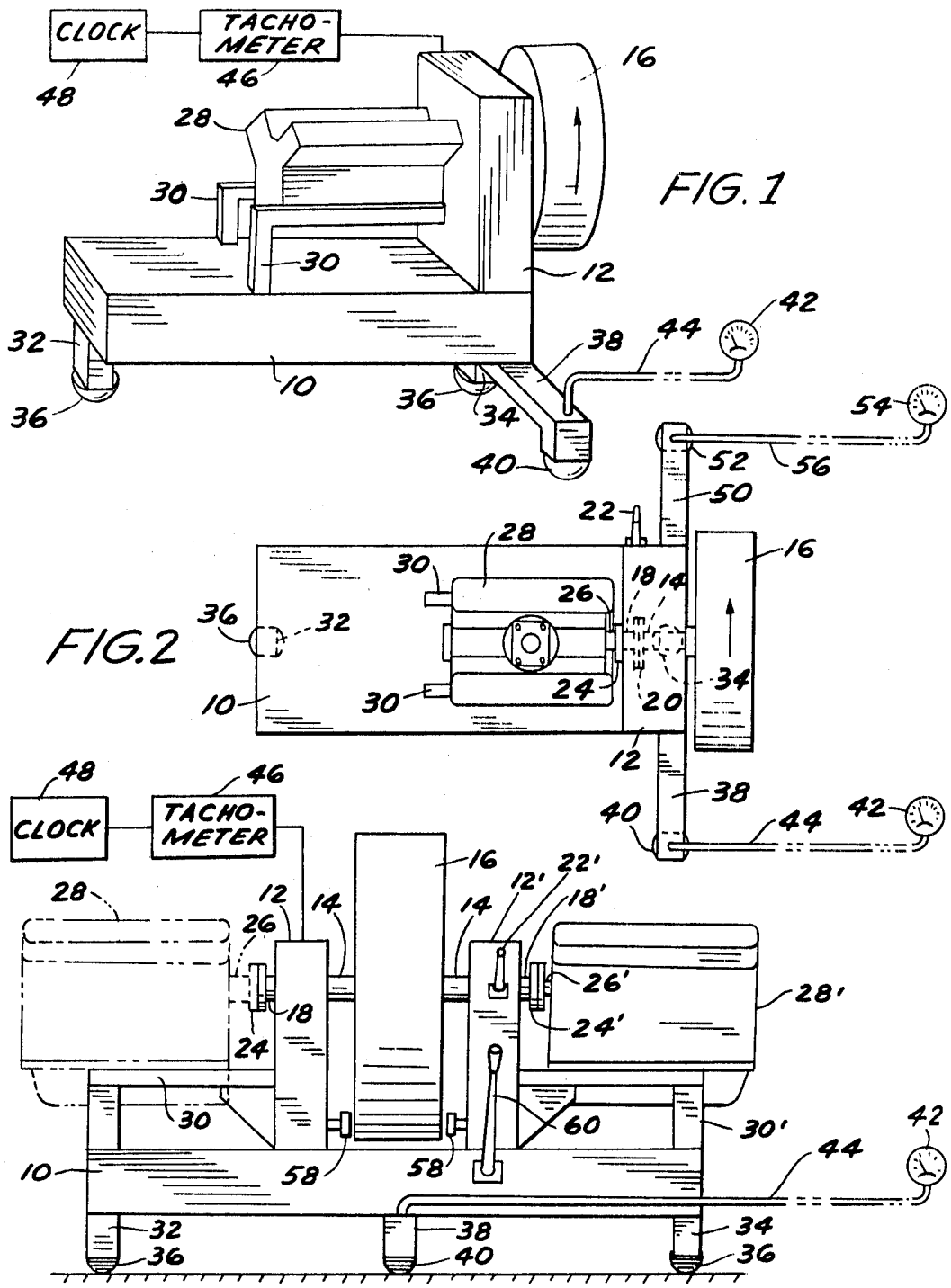

INVENTOR.
CARROLL J. LUCIA
ATTORNEYS

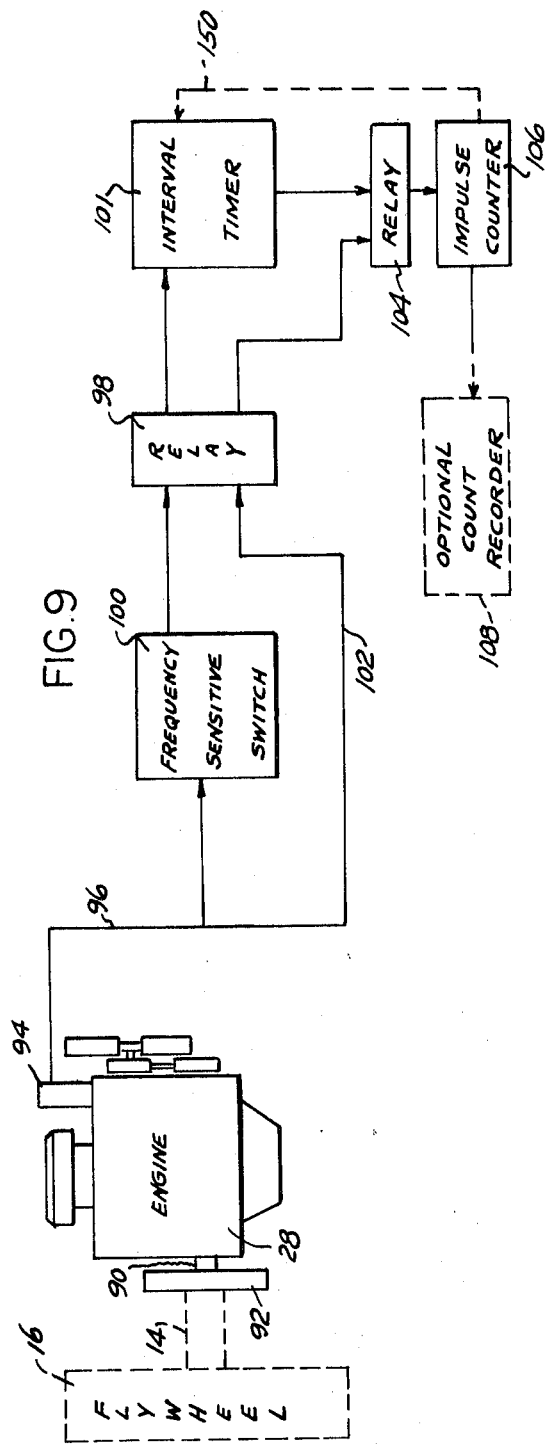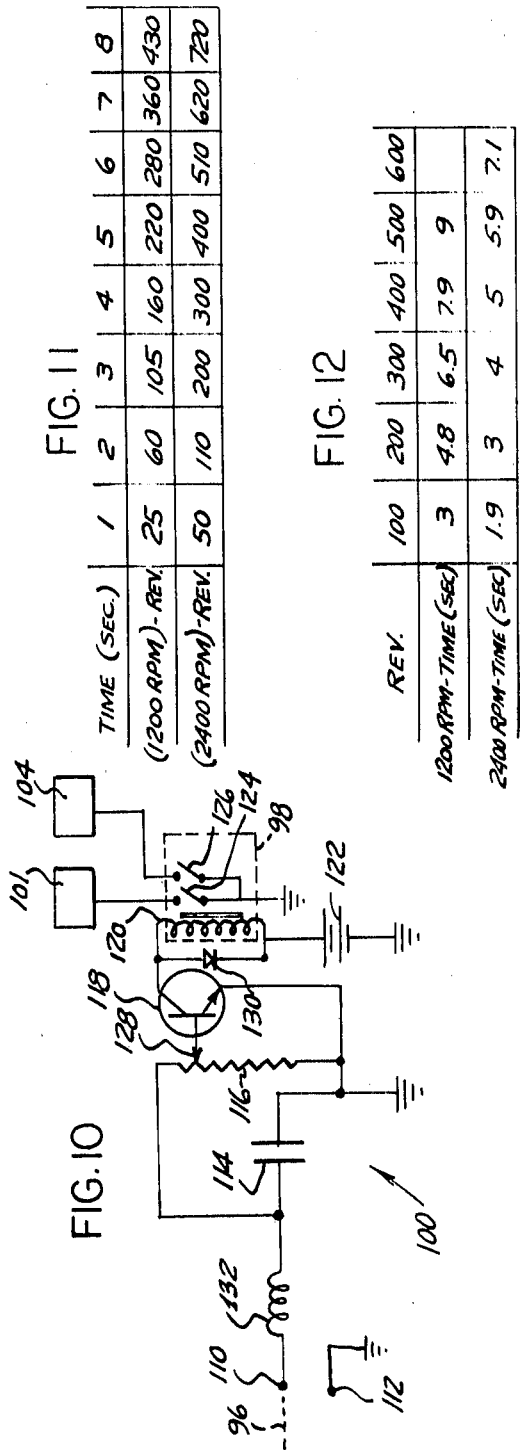

APPARATUS FOR DETERMINING THE TORQUE PERFORMANCE OF PRIME MOVERS

REFERENCE TO RELATED APPLICATIONS

This is a continuation-in-part of applicant's copending application Ser. No. 677,574, filed Oct. 24, 1967, for a "Method and Apparatus for Testing Prime Movers", now Pat. No. 3,505,863, filed Apr. 14, 1970.

BACKGROUND OF THE INVENTION

1. Field of the Invention

The present invention relates to the field of prime mover testing apparatus and methods. It is common practice in the industry to test factory assembled prime movers, such as electric motors, internal combustion engines, gas and steam turbines and the like, by sometime testing all the units manufactured or, more often, spot testing a predetermined percentage of a total production. It is also very common to measure output, performance, efficiency and the like of experimental prime movers and it would be desirable, although not often done, to bench test prime movers repaired or rebuilt in service shops and garages.

2. Description of the Prior Art

The following U.S. Pats. were made of record in the hereinbefore referred to copending application:

U.S. Pats. No. 2,924,095, to H. G. Worstell, 2/9/60;
N. 3,052,117, to B. L. Miller et al., 9/4/62; No. 3,164,986, to R. E. Krueger, 1/12/65; No. 3,279,244, to A. A. Emmerling, 10/18/66; No. 3,289,471, to L. R. Maxwell, 12/6/66; No. 3,331,200, to D. W. Byron et al., 7/18/67.

Normally, tests of prime movers are effected by mounting the primer mover on a test stand and running the prime mover so as to measure the output shaft power or torque under controlled conditions. Often, the output shaft is connected to a dynamometer or brake in order to provide a means of absorbing the energy developed by the prime mover and of measuring such output energy. Gauges and instruments may be connected to diverse portions of the prime mover in order to supply information with respect to, for example, temperatures of diverse parts, pressures in the intake manifold or combustion chambers of internal combustion engines, back pressure at the exhaust, etc. so as to provide a plurality of quantitative data relative to the prime movers being tested.

Dynamometers and the like are costly and delicate apparatus, often difficult to maintain in good operating condition, and require substantially skilled personnel for proper operation and interpretation of the test data.

All known conventional engine torque testers measure the torque at selected substantially constant speeds either when accelerating or decelerating. Such methods require apparatus such as cradled dynamometers of the water brake or electrical brake type to load the engine and absorb the energy.

SUMMARY OF THE INVENTION

The present invention, in a first embodiment, provides a prime mover test method and apparatus having only a heavy flywheel as a moving part, which can be manufactured at low cost and which can provide an indication of the output power or torque of a prime mover without the use of complicated, costly and delicate instruments. Consequently, the present invention provides for storing rather than absorbing the energy developed by a prime mover and thus provides a precise test and diagnosis apparatus for research departments, schools, repair and service shops and the like, where such apparatus are most needed, without requiring any substantial capital investment, or particular skills on the part of the users.

The invention further provides a simplified instrumentation system for counting output shaft revolutions during fixed varied time periods as distinguished from measuring elapsed time it takes to accelerate (or decelerate) an engine having a known inertia mass. This latter method can be used with a separate flywheel attached to the engine drive shaft when testing the engine on a test stand, but it may advantageously be directly incorporated in the vehicle for actual road testing or engine-in-vehicle testing, since the instrumentation components can be grouped into a relatively small package in the form of a portable box or built into the instrument panel of the vehicle for direct reading of engine performance during operation of the vehicle.

The many objects and advantages of the present invention will become apparent when the accompanying description of some of the best modes contemplated to practice the invention is read in conjunction with the accompanying drawings.

BRIEF DESCRIPTION OF THE DRAWINGS

The invention is best understood in conjunction with the accompanying drawings wherein like numerals refer to like or equivalent parts and in which:

FIG. 1 is a schematic perspective view of an example of a prime mover test apparatus according to the first embodiment of the present invention;

FIG. 2 is a top plan view of the apparatus of FIG. 1;

FIG. 3 is a schematic side elevational view of another example of test apparatus according to the present invention, permitting a prime mover to be tested while another prime mover is in the process of being installed on the apparatus;

FIG. 9 is a schematic diagram illustration of an example of instrumentation for use in the present invention;

FIG. 10 is a circuit diagram of a portion of the instrumentation of FIG. 9; and

FIGS. 11 and 12 are graphs useful in explaining the results achieved by the present invention.

DETAILED DESCRIPTION OF THE PREFERRED EMBODIMENT

Figure 4:
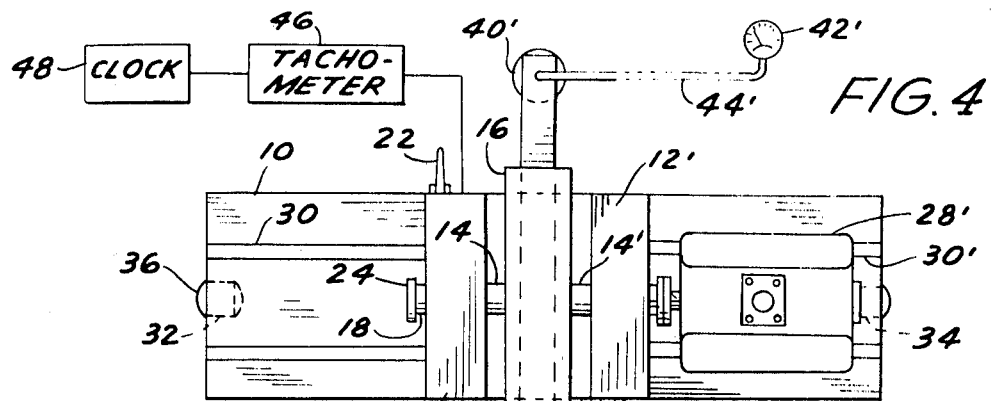
FIG. 4 is a top plan view of the apparatus of FIG. 3.

As shown in FIGS. 1 and 2, an example of test apparatus according to the present invention comprises a substantially rigid support structure including a longitudinally extending frame member or base 10 having a vertically extending pedestal 12 proximate one end thereof. In the example of the structure shown, the pedestal is hollow and is adapted to support, by appropriate bearings, not shown, a shaft 14 adapted to journal in the bearings and having a projecting end on which is mounted a substantially heavy flywheel 16. A second shaft 18 is supported by the pedestal 12 by means of appropriate bearings, not shown, in alignment with the flywheel shaft 14 and is adapted to be controllably connected therewith by means of, for example, a clutch mechanism 20 controlled by a lever 22. The shaft 18 has an end projecting over the base frame member 10 which is provided with a coupling means 24 for connecting to the output shaft 26 of a prime mover 28, shown in the drawing as being an internal combustion engine. An appropriate cradle or support bracket 30 is provided on the frame base 10 for removably mounting the prime mover 28.

It will be appreciated by those skilled in the art that other types of prime movers than the one specifically illustrated in the drawing, such as electric motors, gas turbines, internal combustion engines of the radial or rotary type, etc. may be effectively tested by mounting on the support structure 10 or on the pedestal 12 by appropriate means. It is also evident that the clutch mechanism 20 may be disposed in any appropriate location providing a disconnectable drive for the flywheel 16, and may be of any appropriate convenient structure, including the structure disclosed in U.S. Pat. No. 3,060,730. The support structure base 10 is supported on the ground by way of a pair of legs 32 and 34, each having an appropriate pad 36 engaging the ground, legs 32 and 34 being preferably disposed in a vertical plane passing through the center of gravity or, alternately, being disposed close to such a plane passing through the center of gravity of the apparatus, with an appropriate prime mover mounted thereon. In order to properly balance the support structure with the prime mover mounted thereon such that the center of gravity of the structure falls on the fulcrum line of legs 32 and 34, appropriate counterbalancing weights, not shown, are preferably adjustably mounted to a transverse support fastened to the base 10 or to the pedestal 12. The support structure base 10 is further provided with at least one horizontally projecting leg 38 having a pressure sensing pad 40 disposed on the end thereof in engagement with the ground. An appropriate gauge 42 is connected by an appropriate line 44 to the pressure pad 40 so as to provide an indication of the reaction exerted by the ground upon the pressure pad.

The apparatus further comprises a tachometer 46 appropriately connected, by means well known in the art, to the flywheel shaft 14 to supply an indication of the rotating velocity of the flywheel, for example, in revolutions per minute. A clock 48 may also be provided where precision in the information obtained by the test apparatus of the invention is desired, although the clock may be dispensed with by utilizing an ordinary stop watch or the like.

In order to test the prime mover 28 by means of the apparatus of the invention, the prime mover is started, and the clutch 20 is engaged by means of the lever 22. The prime mover 28 is accelerated until an appropriate rotational velocity of the flywheel 16 as driven by the prime mover is indicated by the tachometer 46, at which time the clock 48, or the stop watch, is started, and the prime mover is accelerated, for example at full open throttle, until the tachometer 46 gives an indication of a second predetermined rotational velocity of the flywheel, at which time the clock 48, or the stop watch is stopped. It is obvious that the tachometer 46 and the clock 48 may be interconnected such that the clock may be automatically started and stopped at such predetermined velocities.

The moment of inertia of the flywheel 16 is known, consequently, the amount of energy required to accelerate the flywheel from a predetermined angular velocity to a second predetermined angular velocity is also known, with the result that the time shown by the clock 48 as having elapsed during such acceleration of the flywheel from the first predetermined velocity to the second predetermined velocity is an inverse function of the average torque developed by the prime mover during acceleration. The gauge 42 continuously records a predetermined pressure or reaction force exerted by the ground upon the pressure pad 40 resulting from the fact that the acceleration of the flywheel 16, being assumed to rotate clockwise, as seen from the right end of FIGS. 1 and 2, causes a reactive force transmitted by the pad 40 to the ground which is directly proportional to the instantaneous torque developed by the prime mover, as a result of permitting the whole frame assembly to be able to swing or rock with respect to the line of contact with the ground of pads 36 of the legs 32—34. Consequently, with appropriate calibration and graduation indicia on its dial, the gauge 42 is adapted to give, at all times, an indication of the instantaneous torque developed by the prime mover during acceleration. It is obvious that the gauge 42 may be replaced with, or interconnected to, an appropriate recorder for providing a chart of the torque developed by the engine, in function of time or in function of r.p.m. at the output thereof.

The test apparatus according to the embodiment of the present invention is also useful in providing an indication of the value of the torque or energy dissipated as losses due to inertia, friction, etc., within the prime mover itself. This is accomplished, for example, by providing the support frame base 10 with a second horizontally projecting leg 50 having on the end thereof an appropriate pressure pad 52 connected to an appropriate gauge 54 by way of a line 56. With the legs 32—34 disposed in a straight line in a vertical plane passing through the center of gravity of the apparatus, when the flywheel 16 is allowed to drive the prime mover 28 with the input energy supply to the prime mover being cut off, the resistance torque or negative torque of the moving parts of the prime mover 28 causes some kinetic energy of the flywheel to be dissipated, which in turn decelerates the flywheel 16, with the result that a reactive torque applied to the support frame base 10 tends to swing or rock the support frame base with respect to the line of contact of pads 26 of the legs 32—34 with the ground, such that the gauge 54 provides a continuous instantaneous indication of the resistance or negative torque of the prime mover. The average resistance or negative torque may be determined by measuring the time taken by the flywheel 16 to decelerate from a first predetermined velocity to a second predetermined velocity.

It is obvious that by disposing the legs 32—34 a given distance beyond the longitudinal vertical plane passing through the center of gravity of the apparatus, leg 50 and gauge 54 may be omitted, and that the gauge 42 becomes adapted to give an indication of both the positive and negative torque of the prime mover during, respectively, acceleration and deceleration of the flywheel. It is also obvious that correction factors must be taken into consideration, such as correction factors regarding the friction between the rotating flywheel 16 and the ambient air, or windage, and friction of the bearings supporting shaft 18 and shaft 14 on which the flywheel is mounted, if very precise test results are desired, although such correction factors are of very small value. Such correction factors are determined once for all, subject only to occasional recalibrations, by driving the flywheel at a first predetermined velocity by means of a prime mover, disconnecting the drive from the prime mover and allowing the flywheel to freely decelerate to a second lower velocity. The time taken for such deceleration is inversely proportional to the energy absorbed through windage, bearing friction losses and vibration.

Further instrumentation may be provided in combination with the test apparatus of the present invention, such as fuel flow meters, temperature gauges, pressure gauges and the like, as may be required to provide any appropriate data with respect to the prime mover being tested.

The example of the invention illustrated in FIGS. 3—4 is substantially alike the hereinbefore described embodiment with the difference however that the flywheel 16 is supported by means of its shaft from two pedestals 12 and 12' disposed symmetrically on both sides of the flywheel. The flywheel 16 is disposed substantially at middistance between the two ends of the support frame base 12, with its axis of rotation substantially in a vertical longitudinal plane passing through the center of gravity of the apparatus. Shaft 14 is controllably connectable to the respective shaft 18 and shaft 18' by means of separate clutch mechanisms, not shown, operable respectively by levers 22 and 22', such that two prime movers may be mounted respectively on cradles or supports 30 and 30' with their output shafts connected, respectively, to shafts 18 and 18' by means of coupling means 24 and 24', such that the flywheel 16 is capable of being driven by either one of the prime movers. In this manner, a prime mover may be in the process of being mounted upon the test apparatus, while the other prime mover is in the process of being tested. Such an arrangement provides a maximum of useful testing time on the apparatus and results in increased efficiency in the testing of prime movers taken from an assembly line, or of prime movers rebuilt or repaired on a production basis.

Preferably, the apparatus of FIGS. 3—4 includes a brake mechanism which may be in the form of a caliper brake, or the like, including appropriate friction plates 58 engageable with the lateral surfaces of the flywheel under the control of a manually operated brake lever 60. Such a brake mechanism is well known in the art and does not require elaborate description. The purpose of the brake mechanism is to stop or slow the flywheel to a manageable speed before one of the prime movers to be tested is connected thereto by engaging the appropriate clutch. The operation of the apparatus of FIGS. 3—4 is as previously explained with respect to the embodiment of FIGS. 1—2, appropriate gauges 42 and 42' being provided for giving an indication of the instantaneous torque developed by either of the prime movers being tested, while the average torque is being given by the time that it takes to accelerate the flywheel 16 from a first predetermined velocity to a second predetermined velocity.

Figures 5, 6:
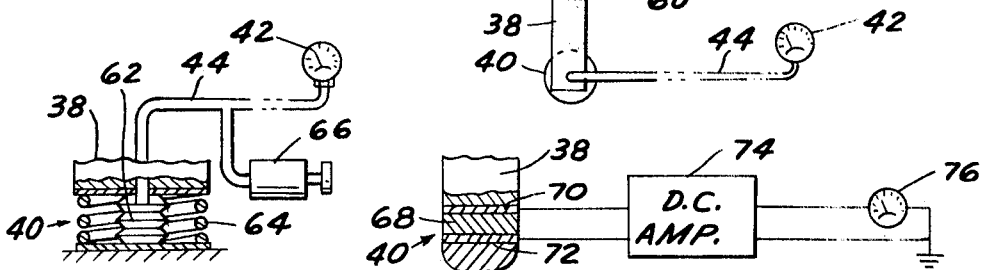
FIG. 5 is a sectional view of a portion of the apparatus of FIGS. 1—4.
FIG. 6 is a view similar to FIG. 5 but showing an alternate arrangement.

FIG. 5 schematically illustrates the details of an example of the pressure pad 40 defined by a bellows 62 disposed between the ground and the horizontally projecting leg 38. A coil spring 64 is also disposed between the ground and the projecting leg 38, as shown in the drawing, or may be disposed inside of the bellows or built in therewith. The interior of the bellows 62 is filled with a pressurized fluid and is placed in communication by a line 44 with the pressure gauge 42, the whole system being filled with pressurized fluid by means of, for example, a fluid tank-pump arrangement such as shown at 66. Consequently, when the apparatus frame is rocked as a result of the reaction torque developed by the flywheel during acceleration, bellows 62 is compressed in function of the value of such reaction torque, with the result that the gauge 42 provides a visual indication of such torque.

FIG. 6 illustrates an example of an alternate torque indicating arrangement wherein the pressure pad 40 consists of a piezoelectrical crystal 68 disposed between the leg 38 and the ground. Pressure applied across the faces 70 and 72 of the piezoelectrical crystal causes a voltage differential between such faces to appear which is proportional to the pressure and which, after amplification by a DC amplifier 74, is used to provide an indication of the torque by way of a gauge 76.

Figure 7:
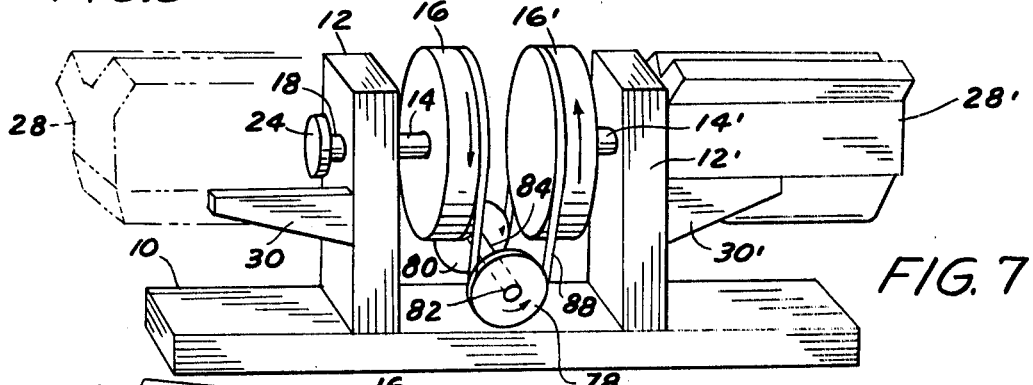
FIG. 7 is a schematic perspective view of a further example of testing apparatus according to the present invention, permitting to test a prime mover by comparison to a second or reference prime mover.
Figure 8:
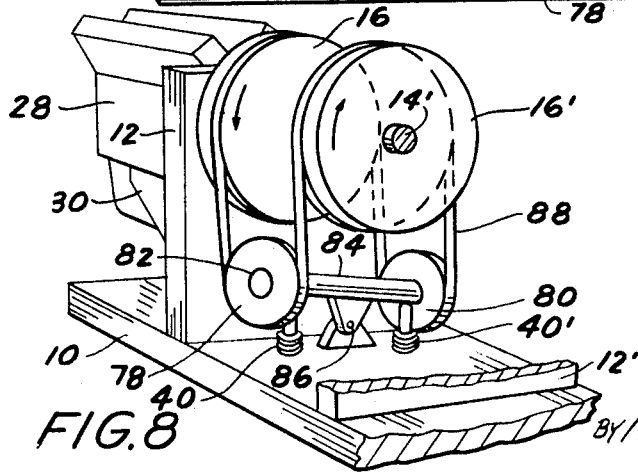
FIG. 8 is a partial perspective end view of the apparatus of FIG. 7, with portions broken away.

FIGS. 7—8 represents a further modification of the present invention, wherein the support frame member or base 10 is normally disposed directly on the ground and is provided with a pair of pedestals 12 and 12' each adapted to support a flywheel, shown at 15 and 16' respectively. The shafts 14 and 14' of the respective flywheels are connectable by clutch means, not shown, to the output shaft of the prime movers 28 and 28' mounted on the support cradle 30 and 30' and individually driving an appropriate flywheel. A pair of pulleys 78 and 80 are mounted on the end of a shaft 82 journaled in a housing 84, transversely supported from the support frame member 10, substantially at middistance between the two flywheels, by way of a pivot 86. An endless belt 88 is wound part of the way around the periphery of the flywheels 16 and 16' and partly around the periphery of the pulleys 78 and 80, as shown, such that the two flywheels are caused to rotate in unison in opposite directions. Pressure pickup pads 40 and 40' are disposed at both ends of the housing 84, proximate pulleys 78 and 80, such that any force tending to swing the housing 84 in one direction or the other can be measured.

In operation, the output shafts of the prime movers 28 and 28' are connected respectively to the flywheels 16 and 16' which they respectively and individually drive. When the two prime movers are simultaneously accelerated, the flywheels are caused to rotate, for example, in the direction of the arrows in opposite directions. If the torques developed by the two prime movers are substantially equal, neither of the flywheels tends to drive or be driven by the other, and the housing 84 of the pulley shaft 82 remains substantially horizontal, with equal forces being detected by the pressure pads 40. However, if one of the prime movers, for example, prime mover 28', develops more torque than the other prime mover, the flywheel 16' connected to the output shaft of the prime mover 28' tends to be accelerated more than the other flywheel 16, therefore tends to drive the flywheel 16. In the example of operation arbitrarily chosen, when flywheel 16' is tending to drive flywheel 16, the pulley 78 is urged upwardly by the action of the belt 88 with the result that the pressure pad 40' gives an indication of an increase of pressure while the pressure pad 40 gives an indication of a decrease of pressure as a result of the tendency of the housing 84 to swing around the pivot 86 in a clockwise direction, as seen in FIG. 8. When the prime mover 28 develops more instantaneous torque than the prime mover 28', the opposite action results. The pressure pads 40 and 40' are connected to appropriate gauges, not shown, providing a visual display of the value of the torque differential.

Consequently, by means of the apparatus of FIGS. 7—8, a prime mover may be compared to a reference prime mover or two prime movers, such as modified internal combustion engines, may be competitively opposed to each other without the attendant danger resulting from opposing competitive motor vehicles on a drag race track or the like.

The principle utilized for performance testing of internal combustion engines and other prime movers according to the present invention is derived from Newton's second law of motion, expressed as $$F=ma$$

in which $F$ is a force which, in the present case, is the torque developed by the engine or prime mover being tested, $m$ is the mass of the moving parts of the engine or prime mover and $a$ is the acceleration of motion of the moving parts.

Due to the acceleration, the moving parts reach an angular velocity $V$, which, expressed in revolution per minute for example, is of the form:

$$V=V_0+at,$$

in which $V$ is the velocity reached by the moving parts as the result of the acceleration, $V_0$ is the initial velocity, and $t$ is the time taken for accelerating from $V_0$ to $V$.

Consequently, $$a=V-V_0/t$$

and, by replacing the acceleration $a$ by its value in the first equation, $$F=m(V-V_0)/t$$

Consequently, if $m$ or the mass of the moving parts is known, $V$ and $V_0$ and $t$ are measured, the torque $F$ can be determined.

By way of the arrangement of FIG. 9, an internal combustion engine or other prime mover may be accurately tested on a bench as well as in normal service, such that its average torque at appropriate r.p.m. may be determined with accuracy, in a practical and almost automatic manner.

As shown in FIG. 9, an internal combustion engine 28, or other prime mover, is mounted on a test stand, not shown, similar to the ones hereinbefore described. The engine output shaft 90 has mounted thereon the usual flywheel 92 which is preferably coupled by means of a drive shaft 14 to a heavy flywheel 16, in the manner hereinbefore explained. A signal proportional to the velocity of rotation of the engine shaft 90 is provided by any convenient means. Such convenient means may consist for example of a tachometer driven from the shaft 14 of the flywheel 16, or more conveniently an indication of the speed of revolution of the engine output shaft may be derived, as shown, from the engine distributor, in the event that the prime mover is a spark-ignited internal combustion engine. For example, one of the spark plug wires at the output of the distributor 94 may be used to provide on a line 96 a pulse signal of a frequency directly proportional to the speed of revolution of the engine output shaft 90. The pulse signal is applied to the input of a normally open relay 98 which is closed upon the engine reaching a predetermined r.p.m. according to the setting of a frequency setting switch 100 adapted to energize the relay 98. The relay 98, when energized, starts an interval timer 101. The frequency dependent signal in line 96 and in a line 102 shunting the frequency sensitive switch 100 is applied as soon as the relay 98 is turned on, through a normally closed relay 104 to the input of an impulse counter 106. The interval timer 101 is adapted, after a predetermined adjustable time period, to turn off the impulse counter 106.

By way of the arrangement shown in FIG. 9, an engine or other prime mover 28 may be tested by accelerating the flywheels 92 and 16 from a predetermined velocity at which the frequency sensitive switch 100 activates a relay 98 so as to start both the interval timer 101 and the input pulse counter 106. After a predetermined time period, both the interval time 101 and the pulse counter 106 are stopped, and a reading is taken from the impulse counter 106 indicating the number of revolutions of the engine during a predetermined elapsed time as indicated by the interval timer 101. Such reading of the number of the revolutions of the prime mover during a predetermined time interval may be automatically recorded by a counter recorder 108, and a plurality of readings may thus be taken and recorded.

The frequency sensitive switch 100 may be simply in the form of a tachometer electrically or mechanically driven from the engine 28 and having a switch automatically closed upon reaching a predetermined settable speed. Alternately, the frequency sensitive switch 100 may be in the form illustrated in FIG. 10, wherein electrical pulses, from one of the engine's spark plug wires for example, are applied to the pair of input terminals 110 and 112. The pulses are adapted to charge a capacitor 114 being continuously discharged through a potentiometer 116 having a terminal connected to the charged plate of the capacitor and its other terminal connected to ground, the other plate of the capacitor 114 being also connected to ground. The RC circuit formed by the capacitor 114 and the potentiometer 116 has a predetermined time constant dependent from the value of the elements such that the capacitor 114 is adapted to accept a charge depending on the frequency of the pulses applied at the input of the circuit. A grounded emitter NPN transistor 118 has its collector connected to a terminal of the coil 120 of the relay 98, the other terminal of the coil being connected to the positive terminal of a power supply, such as a battery 122, the negative terminal of which is grounded. The coil 120 is adapted to actuate both a normally open switch 124, which is disposed in the control circuit of the interval timer 101, and a normally open switch 126 which is connected in the control circuit of the relay 104. The base of the transistor 114 is connected to the slider 128 of the potentiometer 116. The slider 128 of the potentiometer 116 is normally adjusted such that the base of the transistor 118 is biased beyond cutoff and remains so biased even though the capacitor 114 begins to be charged. As the capacitor becomes more charged, as a result of pulses of higher frequency appearing at the input 110—112, the voltage differential across the potentiometer 116 becomes such that the base of the transistor 118 is placed at an appropriate potential turning on the emitter-collector circuit of the transistor. The current flowing through the emitter-collector circuit flows through the coil 120 of the relay 98, thus closing the switches 124 and 126 and activating the interval timer 101 and the relay 104. A diode 130 shunts the coil 120 to protect the transistor 118 from voltage spikes which may occur during switching. An inductor 132 is connected in series in the input of the frequency sensitive switch 100 to prevent high frequency spurious signals from operating the switch.

It can thus be seen that the arrangement of FIG. 9 provides for much flexibility in testing prime movers. The frequency sensitive switch 100 may be adjustably set to turn on the relay 98 at any predetermined r.p.m. of the prime mover, and the interval timer 101 may be adjustably set from a fraction of a second to several seconds. All the instruments and elements are commercially available and they may be easily packaged in a relatively small volume such as to be easily carried within a vehicle and used under actual operating conditions, or they may be made part of the instrument cluster in some vehicles.

The present invention provides an apparatus and method useful in also determining the mass or inertia of the moving parts of a prime mover.

The mass $m_1$ of the flywheel 16 and of the connecting shaft 14 is known. The mass $m_x$ of the moving parts of the engine 28 or other prime mover, is unknown. The unknown mass $m_x$ can be determined by way of the system of the present invention by first accelerating the prime mover 28 from a first predetermined velocity to a second predetermined velocity, with the flywheel 16 disconnected, such as to determine the average torque of the prime mover in such velocity range, such torque being $$F = m_x a_1, \text{ and}$$
$$a_1 = V - Vo/t_1$$

The flywheel 16 is then connected to the engine or prime mover 28, and the same test is repeated by accelerating the engine between the same initial velocity $Vo$ to the final velocity $V$, such that the average torque is $$F = (m_o + m)a_2$$

wherein $m_o$ is the known mass of the flywheel 16 and shaft 14, and:

$$a_2 = V - Vo/t_2$$

Consequently:

$$F = m_x a_1 (m_o + m_x) a_2$$
$$m_x a_1 = m a_2 + m_o a_2$$
$$m_x a_1 - m_x a_2 = m_o a_2$$
$$m_x (a_1 - a) = m_o a_2$$
$$m_x = m_o a / a_1 - a_2$$

As $m_o$, $a_1$ and $a_2$ are known, $m_x$ can thus be determined. Once the mass, $m_x$, of the prime mover rotating parts is determined with precision, average torques of the prime mover between selected velocities of rotation of the output shaft can be determined by the present invention, simply by accelerating the prime mover, with or without the flywheel 16 connected to the output shaft thereof, and making readings of the revolution counts during predetermined time intervals.

Referring again to the arrangement of FIG. 9, it is immediately obvious that the impulse counter 106 may be replaced by a tachometer, or that the frequency sensitive switch 100 and the impulse counter 106 may be replaced by a tachometer with appropriate relay switches connected to the interval timer 101 for starting and stopping the interval timer at predetermined r.p.m. of the prime mover output shaft during an acceleration or deceleration test. Commercially available tachometers, however, definitely lack precision and sensitivity. Consequently, the preferred arrangement is the one illustrated schematically at FIG. 9, utilizing an impulse counter of any type available commercially, such as manufactured by Hewlett-Packard Company, and which are capable of counting with high precision at a high-counting rate. The relationship between the time measurement by the interval timer 101 and the number of revolutions of the prime mover output shaft as measured by the impulse counter 106 permits to derive, by simple calculation, the average r.p.m. of the output shaft during the measured time intervals.

The invention permits to obtain a qualitative and quantitative appreciation of the average torque developed by an internal combustion engine, or any other prime mover, which is substantially representative of the efficiency of the prime mover, but which requires the taking of only a few elapsed time measurements, and the counting of revolutions occurring within the same number of fixed periods of time, preferably of equal duration but not necessarily so.

By means of the basic arrangement of FIG. 9, and utilizing preferably an arrangement comprising a plurality of frequency sensitive switches 100, relays 98, interval timers 101, and impulse counters 106, the acceleration of the prime mover 28, and consequently its average torque may be determined in successive time intervals. By utilizing only one frequency sensitive switch, and interval and impulse counter, and appropriate relays, a plurality of average accelerations during predetermined time periods can also be determined through a succession of tests with different settings for the frequency sensitive switch 100. The average angular velocity of the output shaft of the prime mover can readily be determined within each of the time intervals, as each time interval is known and the number of revolutions of the output shaft during such time interval is also known as indicated by the impulse counter, a rough estimation of the average torque of the prime mover within predetermined velocity ranges may be determined.

Referring again to FIG. 9, by means of feedback as shown at 150 between the impulse counter 106 and the interval timer 101, the impulse counter 106 may alternately be arranged to stop the interval timer 101 after a predetermined number of revolutions of the prime mover output shaft. From the number of revolutions as indicated by the impulse counter 106 and from the time interval as indicated by the interval timer 101, the angular velocity of the prime mover output shaft is readily determined, and the acceleration from one angular velocity to the next is thereby readily determined.

Consequently, by means of the arrangement of FIG. 9, either the number of revolutions of the prime mover 28 within a predetermined time interval, according to the setting of the interval timer 101, may be counted and displayed by the impulse counter 106 or, alternately, a predetermined count representing 1of revolutions of the prime mover may be utilized to actuate the interval timer 101, which thus displays the time taken by the output shaft of the prime mover for rotating such a predetermined number of revolutions. By thus counting the number of revolutions within predetermined constant time slots during acceleration of the prime mover from a predetermined angular velocity of its output shaft or by measuring the variable time taken during acceleration to revolve the output shaft predetermined number of revolutions, the performance of a prime mover may be compared to the ideal performance of a standard or reference prime mover. In this manner, the performance of a repaired prime mover or of a prime mover having had some service can be compared to such standard performance in order to determine whether the tested prime mover has been properly repaired or whether it is in need of repair.

FIG. 11 is an arbitrary example of a portion of a typical chart used for qualitative comparison purpose of a prime mover utilizing the arrangement of FIG. 9. At FIG. 11 there is shown in the vertical columns predetermined time slots spaced equally, for example, at a 1-second interval. The first horizontal column shows the number of revolutions, or pulses recorded by the impulse counter, during respectively the 1st, 2nd, 3rd, etc. second of acceleration of a typical prime mover of a predetermined manufacture, type and model during full power acceleration from 1,200 r.p.m. The second horizontal column provides the same information with respect to acceleration from 2,400 r.p.m. If the tested prime mover registers numbers of revolutions on the impulse counter 106 below those indicated on the chart, there is an indication that the prime mover is not up to standard. On the other hand, if the number of pulses registered by the impulse counter 106 is at least equal to the number of pulses indicated on the chart for the appropriate period of time of acceleration, the tested prime mover is up to standard.

FIG. 12 is a typical example of a portion of a standard chart providing predetermined revolution counts and variable time slots. The vertical columns relate to predetermined fixed number of revolutions of the standard prime mover and each horizontal column indicates the time taken during full power acceleration of the standard prime mover from a predetermined r.p.m. to rotate such predetermined number of revolutions. For example, a typical prime mover of a predetermined manufacture, type and model, when accelerated from 1,200 r.p.m. at full throttle, under the same conditions of test as the tested prime mover 28, will take 3 seconds to show 100 revolutions on the impulse counter 106, 4.8 seconds to show 200 revolutions, etc. If the tested prime mover takes a longer time than the one shown on the chart, the tested prime mover is below standard, but if its acceleration is at least equal to what is indicated on the chart, it is up to standard.

Consequently, the present invention permits to determine the torque quality of a prime mover without complicated instrumentation, and without the attendant cost of conventional dynamometers and the like.

Having thus described the invention by way of typical examples thereof given for illustrative purpose only, what I claim to be protected by United States Letters Patent is as follows:

1. An apparatus for determining the performance of a prime mover having a rotating output shaft, said apparatus comprising:

pulse-generating means for providing a predetermined number of electrical pulses for each revolution of said output shaft;

normally open frequency sensitive switch means connected to said pulse-generating means and adapted to close at a predetermined frequency;

interval timer means connected to said frequency sensitive switch means and adapted to be started upon closure of said frequency sensitive switch means; and pulse counter means connected to said pulse-generating means and controlled by said frequency sensitive switch means for being started upon starting of said interval timer means.

2. The apparatus of claim 1, further comprising:
means controlled by said interval timer means for stopping said pulse counter means after a predetermined elapsed time has been recorded by said interval timer means.

3. The apparatus of claim 1, further comprising:
means controlled by said pulse counter means for stopping said interval counter means after a predetermined number of pulses has been recorded by said pulse counter means.

4. The apparatus of claim 1, further comprising a flywheel of known inertia connectable to said output shaft.

UNITED STATES PATENT OFFICE
CERTIFICATE OF CORRECTION

Patent No. 3,592,053         Dated July 13, 1971

Inventor(s) CARROLL J. LUCIA

It is certified that error appears in the above-identified patent and that said Letters Patent are hereby corrected as shown below:

IN THE SPECIFICATION

Column 6, line 35, correct the equation to $$-- a = \frac{V - V_o}{t} --$$

Column 8, line 13, correct the equation to $$-- F = (m_o + m_x) a_2 --$$

line 18, correct the equations to $$-- F = m_x a_1 = (m_o + m_x) a_2$$

$$m_x a_1 = m_o a_2 + m_o a_2$$

$$m_x a_1 - m_x a_2 = m_o a_2$$

$$m_x (a_1 - a_2) = m_o a_2$$

$$m_x = \frac{m_o a_2}{a_1 - a_2} --$$

Column 9, line 16, after "representing" cancel "lof" and insert -- the number of --

Signed and sealed this 25th day of January 1972.

(SEAL)
Attest:

EDWARD M. FLETCHER, JR.          ROBERT GOTTSCHALK
Attesting Officer                Commissioner of Patents